United States Patent
Kojima

Patent Number: 5,495,520
Date of Patent: Feb. 27, 1996

[54] CORDLESS TELEPHONE SYSTEM AND IDENTIFICATION CODE SETTING METHOD THEREFOR

[75] Inventor: Susumu Kojima, Tokyo, Japan

[73] Assignee: NEC Corporation, Tokyo, Japan

[21] Appl. No.: 264,057

[22] Filed: Jun. 22, 1994

[30] Foreign Application Priority Data

Jun. 25, 1993 [JP] Japan .................................. 5-155518

[51] Int. Cl.$^6$ ...................................... H04Q 7/20
[52] U.S. Cl. ................................ 379/62; 379/61
[58] Field of Search .............................. 379/62, 61, 63, 379/58, 356, 354, 355

[56] References Cited

U.S. PATENT DOCUMENTS

| | | | |
|---|---|---|---|
| 4,979,205 | 12/1990 | Haraguchi et al. | 379/61 |
| 5,068,889 | 11/1991 | Yamashita | 379/62 |
| 5,157,710 | 10/1992 | Itoh | 379/62 |

FOREIGN PATENT DOCUMENTS 2309847  12/1990  Japan .

Primary Examiner—Curtis Kuntz
Assistant Examiner—Michael B. Chernoff
Attorney, Agent, or Firm—Whitham, Curtis, Whitham & McGinn

[57] ABSTRACT

In a cordless telephone system, a master unit adds to a registration signal an identification (ID) code assigned to a slave unit connectable to the master unit, a master unit transmission password, and an ID code assigned to the master unit, and sends the resulting registration signal to the slave unit. On receiving the registration signal, the slave unit determines whether or not the master unit transmission password is identical with a slave unit password stored therein. If the former is identical with the latter, the slave unit writes the master unit ID code therein, adds the master unit ID code, slave unit transmission password, and slave unit ID code to an end-of-registration signal, and then sends the signal to the master unit. On receiving the end-of-registration signal, the master unit writes the slave unit ID code included in the signal if the slave unit transmission password is identical with a password stored therein.

7 Claims, 8 Drawing Sheets

CORDLESS TELEPHONE SYSTEM AND IDENTIFICATION CODE SETTING METHOD THEREFOR

BACKGROUND OF THE INVENTION

The present invention relates to a method of registering a portable telephone unit included in a cordless telephone system, more particularly, a method of registering, on the master and slave units, a relationship allowing connection thereof.

It is a common practice with a cordless telephone system to write the same ID code in a master and a slave or portable unit at the time of shipment from a factory. In the event of communication, the master and slave units each sends the ID code together with a control signal, while the other executes processing only if the ID code included in the control signal is identical with the ID code stored therein. Although this kind of scheme is successful in eliminating erroneous connection, it has some issues yet to be solved, as follows.

A definite relation is set up, at the time of shipment, between the master and slave units as to whether or not they are permitted to be connected to each other, as mentioned above. Stated another way, it is impossible for a single slave unit to be selectively connected to a plurality of master units. This brings about a problem that a person is prevented from carrying the slave unit from, for example, a home to a relative's home, office or similar remote place and use it there. In this way, the conventional approach, assigning a single ID code to both the master and the slave units, is not practicable when it comes to a system wherein each slave unit is connectable to a plurality of master units. Therefore, it is necessary to assign a particular ID code to each of the master units and slave units, and to cause each unit to write therein the ID code of the other unit to which it is to be connected. Since no definite relations as to connectability can be set up between the master and the slave units at the time of shipment, it is necessary that each user can register, after shipment, a relation regarding connectability, i.e., the ID codes of the connectable master and slave units at each other.

For the registration of the ID codes, signals have to be interchanged between the master and the slave units over either a wired transmission path or a wireless or radio transmission path. An ID code setting method using a wired transmission path is disclosed in, for example, Japanese Patent Laid-Open Publication No. 2-309847. In this Laid-Open Publication, the transmission path is implemented by a charging line which is connected to the master and slave units via a terminal which is provided on the master unit for Charging the slave unit. The master unit is operated to set the ID codes. However, the problem with such a wired transmission path scheme is that a circuit for constructing an exclusive wired path for registration is needed which would increase the cost.

By contrast, a registering method using a radio transmission path can use radio communication functions originally incorporated in the master unit and slave unit and, therefore, does not need any extra circuit for registration. However, when the registration is simply performed on the master unit, as taught in the above-mentioned Laid-Open Publication, it is apt to be erroneous if some other slave units are awaiting registration in the neighborhood. Therefore, the prerequisite with the method using a radio transmission path is that the registration be sure and safe even when a plurality of pairs of master and slave units, which are located close to each other, are manipulated for registration at I the same time.

SUMMARY OF THE INVENTION

It is, therefore, an object of the present invention to provide a cordless telephone system which insures sure and safe registration even when a plurality of groups of master and slave units neighboring each other are operated for registration at the same time, and an ID code setting method therefor.

A cordless telephone system of the present invention has a plurality of groups of master units and slave units permitted to be connected to each other, and each including transmitting/receiving circuit for interchanging signals over a radio channel. The master units and slave units each have a storing circuit for storing a master unit ID code and a slave unit ID code which are different from each other, and a control circuit for controlling the transmitting/receiving circuit. The master units each have a master unit operating circuit accessible for entering the slave unit ID code and a slave unit password assigned to one of the slave units to be newly connected to the master unit, and a master unit password assigned to the master unit. The slave units each have a slave unit operating circuit accessible for entering the master unit ID code and the master unit password assigned to the master unit to which the slave unit is to be newly connected, and the slave unit password assigned to the slave unit. The control circuits of the master units each have a transmitter for transmitting a registration signal to which are added the slave unit ID code and slave unit password entered, and the master unit ID code stored in the master unit. The control circuits of the slave units each have a memory for storing, if the slave unit ID code and the slave unit password added to the registration signal are respectively identical with the slave unit ID code stored and the slave unit password entered, the slave unit ID code of the registration signal in the storing circuit, and sending an end-of-registration signal to which are added the master unit ID code and master unit password entered, and the slave unit ID code stored. Further, the control circuits of the master units each have a memory for storing, if the master unit ID code and the master unit password added to the end-of-registration signal are respectively identical with the master unit ID code stored and the master unit password entered, the slave unit ID code added to the end-of-registration signal in the storing circuit.

The control circuits of the master unit and slave unit, which are permitted to be connected to each other, may respectively further include an adder for adding the master unit ID code and slave unit ID code stored to control signals to be interchanged to thereby confirm a unit sent the control signals and the unit to receive them, thereby eliminating erroneous connection.

BRIEF DESCRIPTION OF THE DRAWINGS

The above and other objects, features and advantages of the present invention will become more apparent from the following detailed description when taken with the accompanying drawings in which.

DETAILED DESCRIPTION OF THE PREFERRED EMBODIMENTS

Figure 1:
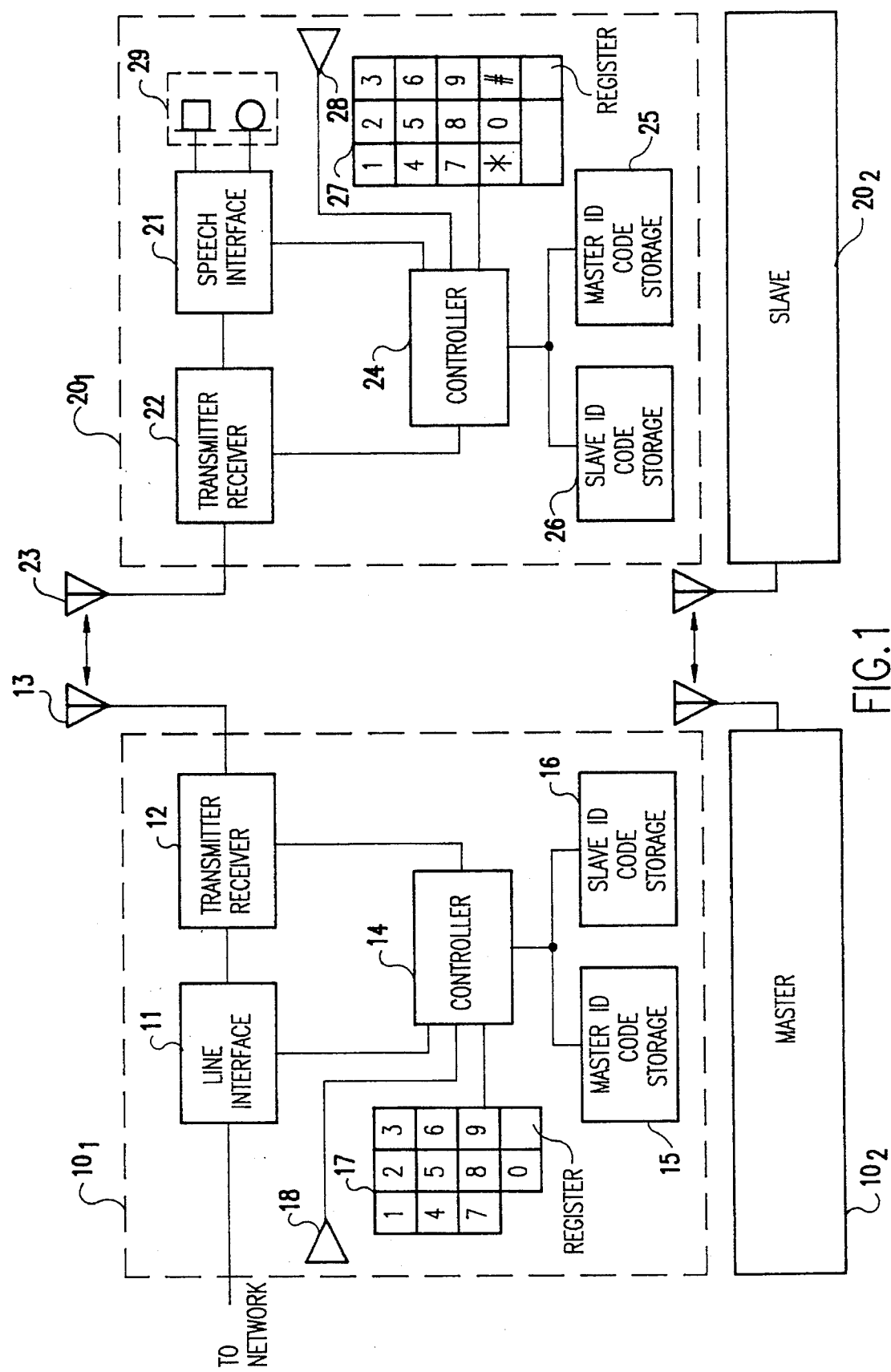
FIG. 1 is a block diagram schematically showing a first embodiment of the cordless telephone system in accordance with the present invention.

Referring to FIG. 1 of the drawings, a first embodiment of the cordless telephone system in accordance with the present invention is shown. As shown, the system includes a plurality of master units $10_1$ and $10_2$ and a plurality of slave or portable units $20_1$ and $20_2$ which are permitted to communicate with the master units $10_1$ and $10_2$, as needed. The master units $10_1$ and $10_2$ and slave units $20_1$ and $20_2$ respectively have radio transmitter/receivers 12 and 22 for transmitting and receiving signals over a radio channel. The master units $10_1$ and $10_2$ each have a master unit ID code storage 15, a slave unit ID code storage 16, the radio transmitter/receiver 12, and a controller 14 for controlling the transmitter/receiver 12. Likewise, the slave units $20_1$ and $20_2$ each have a master unit ID code storage 25, a slave unit ID code storage 26, a radio transmitter/receiver 22, and a controller 24 for controlling the transmitter/receiver 22. The storages 15, 16, 25 and 26 each stores a particular ID code or codes which will be described later. In each of the master units $10_1$ and $10_2$, a line interface 11 is connected between the transmitter/receiver 12 and a telephone network and controlled by the controller 14, while a speaker 18 is connected to the controller 14. In each of the slave units $20_1$ and $20_2$, a speech interface 21 is connected between the controller 24 and a speaker and microphone section 29, and a speaker 28 connected to the controller 24.

Assume that connection is to be newly permitted between the master unit $10_2$ and the slave unit $20_1$ in order to promote the understanding of the illustrative embodiment. The master unit $10_2$ includes an operating section 17 accessible for entering a slave unit ID number assigned to the slave unit $20_1$, a slave unit password in the form of a master unit transmission password, and a master unit password implemented by a password stored in the master unit $10_2$. On the other hand, the slave unit $20_1$ has an operating section 27 accessible for entering a master unit ID number assigned to the master unit $10_2$, a master unit password in the form of a slave unit transmission password, and a master unit password implemented by a password stored in the slave unit $20_1$. The controller 14 includes a circuit for controlling the transmission of a registration signal to which are added the slave unit ID code, master unit transmission password, and stored master unit ID code. The controller 24 includes a memory for storing, if the slave unit ID code and master unit transmission password added to the registration signal are respectively identical with the slave unit ID code stored in the slave unit $20_1$ and the stored slave unit password entered on the unit $20_1$, the master unit ID code added to the registration signal in the master unit ID code storage 25, and sending an end-of-registration signal to which are added the master unit ID code and slave unit transmission password entered on the slave unit $20_1$ and the stored slave unit ID code. The controller 14 further includes another memory for storing, if the master unit ID code and slave unit transmission password added to the end-of-registration signal are respectively identical with the master unit ID code stored in the master unit $10_1$ and the stored master unit password entered on the unit $10_1$, the slave unit ID code added to the end-of-registration signal in the slave unit ID code storage 16.

The controllers 14 and 24 each further include an adder for adding the stored master unit or slave unit ID code to a control signal to be interchanged with the other, thereby confirming the unit sent or received the control signal. This is successful in eliminating erroneous connection.

The controller 14, which controls the operation of the master unit $10_1$ ($10_2$) includes a microprocessor, a ROM (Read Only Memory), and a RAM (Random Access Memory). Specifically, by controlling the line interface 11, the controller 14 detects an incoming call from the telephone network, originates a call to the network, and dials. Also, by controlling the radio transmitter/receiver 12, the controller 14 interchanges connection control signals with the slave unit $20_1$ ($20_2$) and sets up a radio communication path over a radio channel according to a predetermined radio protocol.

The master unit ID code is written to the master unit ID code storage 15 at the time of shipment. One or more slave unit ID codes are written to the slave unit ID code storage 16, implemented by an electrically erasable nonvolatile memory, by a particular procedure which will be described later. In the event of control over call connection, the controller 14 reads, when generating a call connection control signal to interchange with the slave unit $20_1$, the master unit ID code and slave unit ID code out of the storages 15 and 16, respectively, and adds them to a call connection control signal.

Further, by monitoring the operating section 17, the controller 14 detects and analyzes user's manipulation and executes necessary processing. As shown in FIG. 1 specifically, the operating section 17 has push-button switches labeled "1" to "0" and "Register". The pushbutton switches are manipulated as will be described later specifically.

A speech signal from the slave unit $20_1$ is transferred to the telephone network via the radio transmitter/receiver 12 and line interface 11. A speech signal from the telephone network is sent to the slave unit $20_1$ via the line interface 11 and transmitter/receiver 12.

The controller 24, which controls the operation of the slave unit $20_1$ ($20_2$), includes a microprocessor, a ROM, and a RAM. By monitoring the operating section 27, the controller 24 detects user's manipulations for call originating and call termination and executes necessary processing. Also, by controlling the radio transmitter/receiver 22, the controller 24 interchanges call connection control signals with the master unit $10_1$ ($10_2$) and sets up a radio communication path over a radio channel according to a predetermined radio protocol.

A slave unit ID code is written to the slave unit ID code storage 26 at the time of shipment. One or more master unit ID codes are written to the master unit ID code storage 25, implemented by an electrically erasable nonvolatile memory, by a particular procedure which will be described later. In the event of call connection control, the controller 24 reads, when generating a call connection control signal to interchange with the master unit $10_1$ ($10_2$), the slave unit ID code and master ID code out of the storages 26 and 25, respectively, and adds them to the call connection control signal.

Further, the controller 24 drives the speaker 28 to output a ring tone.

A speech signal from the master unit $10_1$ ($10_2$) is received by the radio transmitter/receiver 29 via the speech interface 21, while a speech signal from the speaker and microphone section 29 is sent to the master unit $10_1$ via the speech interface 21 and transmitter/receiver 22.

As also shown in FIG. 1 specifically, the operating section 27 has push-button switches labeled "1" to "0", "Talk" and "Register". The switches "1" to "0" are used to dial, while the switch "Talk" is used to originate a call or to respond to an incoming call. The switch "Register" is manipulated as will be described later specifically.

A reference will be made to FIGS. 2 and 3 for describing specific operations of the controllers 14 and 24 included in the master unit $10_1$ and slave unit $20_1$, respectively.

To register a relation regarding the permission of connection, the user presses the "Register" button of the slave unit $20_1$. Then, the user manipulates any of the "1" to "0" buttons arranged on the operating section 27 of the slave unit $20_1$ in order to enter the ID code given to the master unit $10_1$ of interest (labeled on the master unit) and the slave unit password stored in the unit $20_1$; the ID code and password each have a predetermined number of digits. Subsequently, the user presses the "Register" button of the master unit $10_1$ and then manipulates the "1" to "0" buttons arranged on the operating section 17 of the unit $10_1$ in order to enter a slave unit password given to the unit $20_1$ (labeled on the slave unit), a password stored in the unit $10_1$, and a master unit transmission password in a predetermined number of digits. In the illustrative embodiment, the password stored in the master unit $10_1$ and the slave unit transmission password have the same value. Also, for the master unit transmission password and slave unit transmission password, the same value is entered. On the completion of registration, the speaker 28 of the slave unit $20_1$ produces a particular tone, informing the user of the completion.

Figure 3:
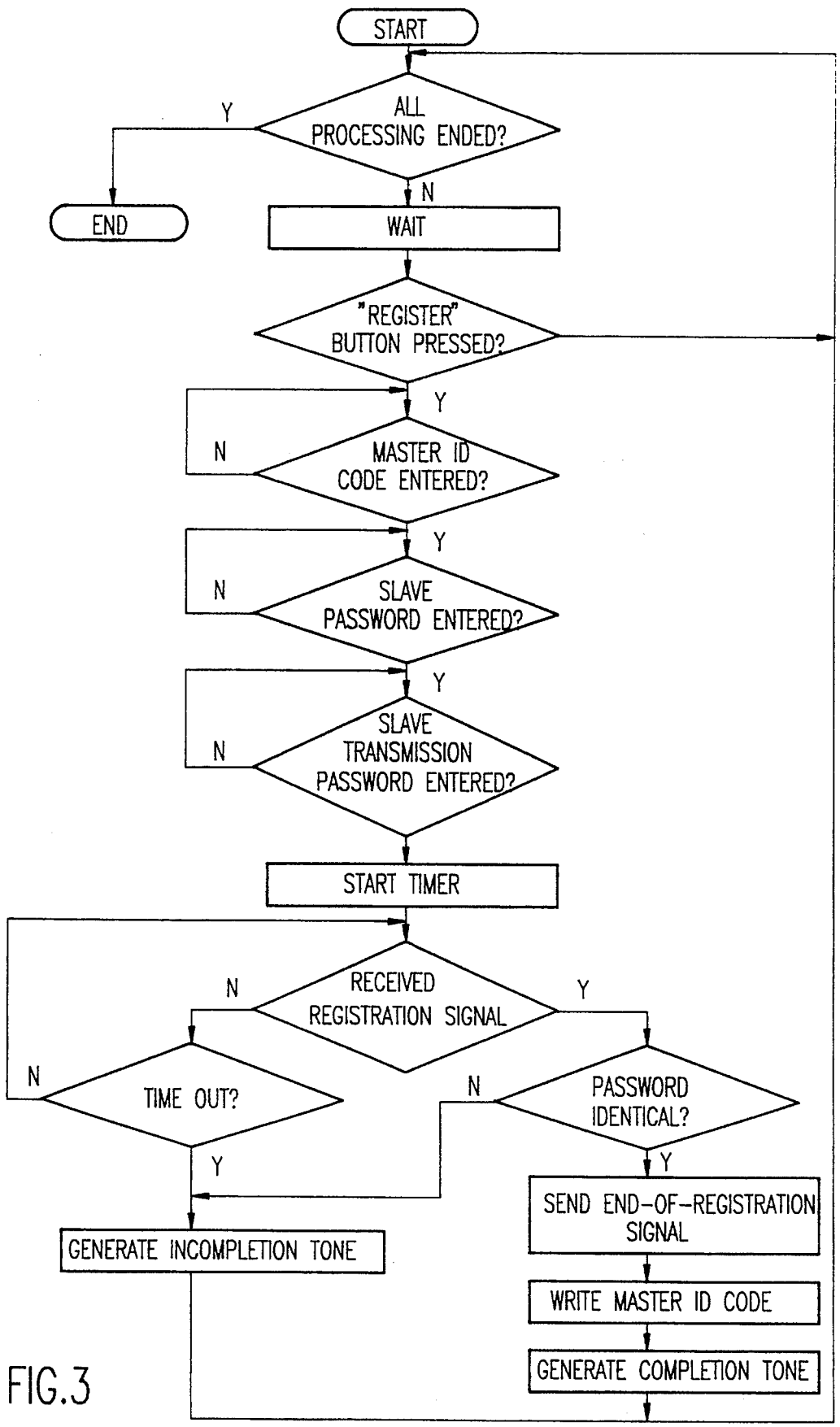
FIG. 3 is a flowchart representative of a specific operation of a controller included in a slave unit forming the other part of the first embodiment.

Specifically, as shown in FIG. 3, assume that the "Register" key of the slave unit $20_1$ is pressed while the unit $20_1$ is in a stand-by state. Then, the controller 24 of the unit $20_1$ awaits the entry of the ID code of the master unit $10_1$ to which the unit $20_1$ is connectable. On detecting the entry of a predetermined number of digits of numerals on the slave unit $20_1$, the controller 24 awaits the entry of the password stored in the unit $20_1$ and a slave unit transmission password to be input in this order. When such passwords are fully entered, the controller 24 starts a timer, not shown, and waits for a registration signal from the master unit $10_1$. On receiving the registration signal, which includes the ID code stored in the storage 26, the controller 24 determines whether or not the master unit transmission password, also included in the registration signal, is identical with the password stored in the slave unit $20_1$. If the former is identical with the latter, the controller 24 sends an end-of-registration signal, including the master unit ID code, slave unit transmission password and slave unit ID code, to the master unit $10_1$ via the transmitter/receiver 22. At the same time, the controller 24 writes the master unit ID code of the received registration signal in an idle address location available in the storage 25. Finally, the controller 24 produces a completion tone via the speaker 28. If the registration signal is not received within a predetermined period of time as counted by the timer or if the two passwords are not identical, the controller 24 produces an incompletion tone via the speaker 28 and returns to the stand-by state. The predetermined period of time mentioned above is several seconds selected in consideration of a period of time necessary for the user to operate the master unit $10_1$ and a period of time necessary for signals to be interchanged over the radio channel.

Figure 2:
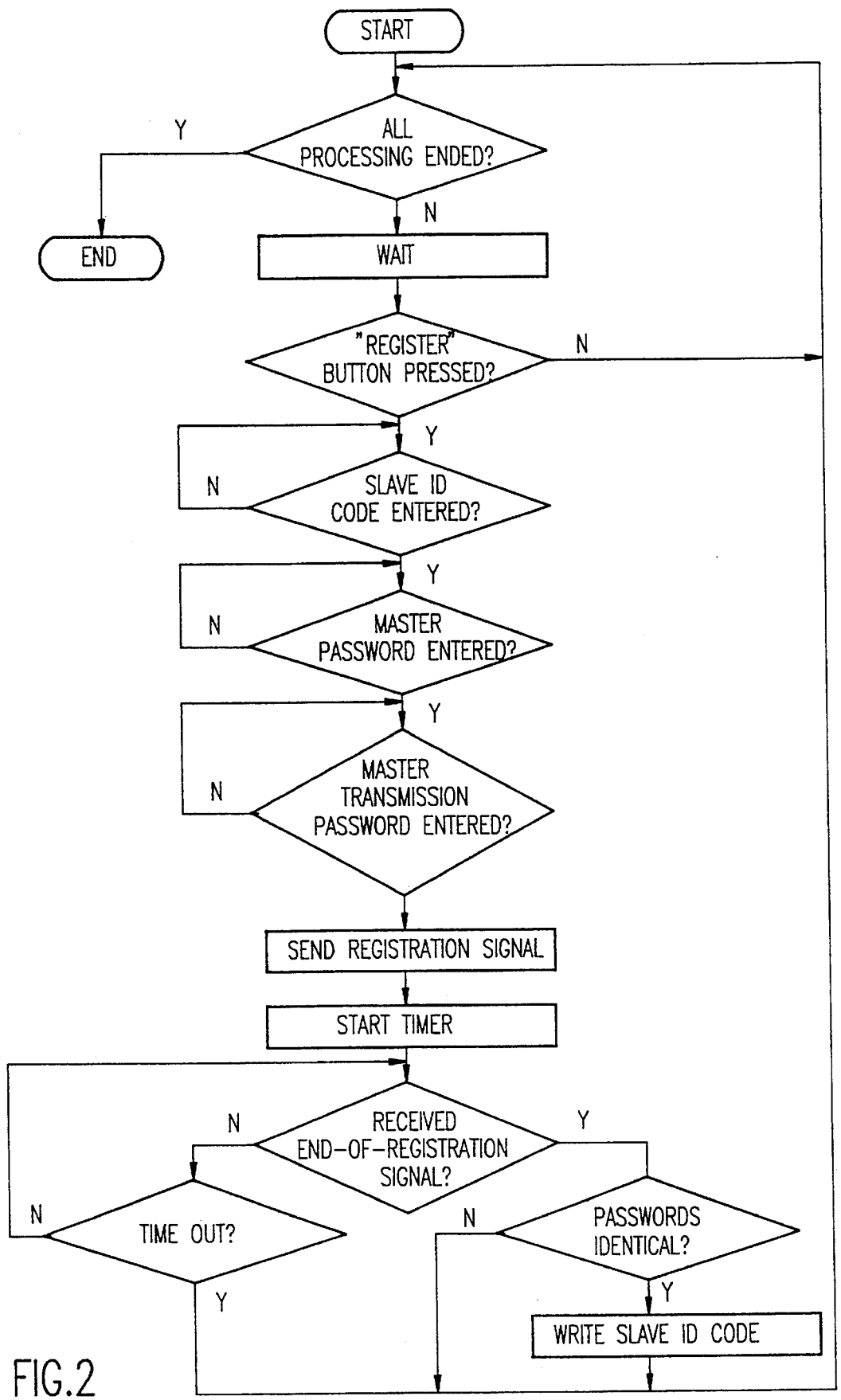
FIG. 2 is a flowchart demonstrating a specific operation of a controller included in a master unit which forms part of the first embodiment.

As shown in FIG. 2, assume that the controller 14 of the master unit $10_1$ has detected the depression of the "Register" button of the unit $10_1$ while in a stand-by state. Then, the controller 14 awaits the entry of the ID code of the slave unit $20_1$ which is to be registered thereat. On detecting the depression of a predetermined number of digits of numerals on the master unit $10_1$, the controller 14 waits for the password stored in the unit $10_1$ and master unit transmission password to be entered in this order. Subsequently, the controller 14 generates the registration signal including such two kinds of information and master unit ID code stored in the storage 15. The registration signal is sent to the slave unit $20_1$ via the transmitter/receiver 12. At the same time, the controller 14 starts a timer, not shown, and waits for the end-of-registration signal from the slave unit $20_1$. On receiving the end-of-registration signal, which includes the slave unit ID code, the controller 15 determines whether or not the slave unit transmission password, also included in the end-of-registration signal, is identical with the password stored in and entered on the master unit $10_1$. If the former is identical with the latter, the controller 14 writes the entered slave unit ID code in an idle address location available in the storage 16. If the end-of-registration signal is not received within a predetermined period of time as counted by the timer or if the two passwords are not identical, the controller 14 returns to the stand-by state. In this case, the predetermined period of time should only be as short as several seconds since the user's operating time does not have to be taken into account.

Figure 4:
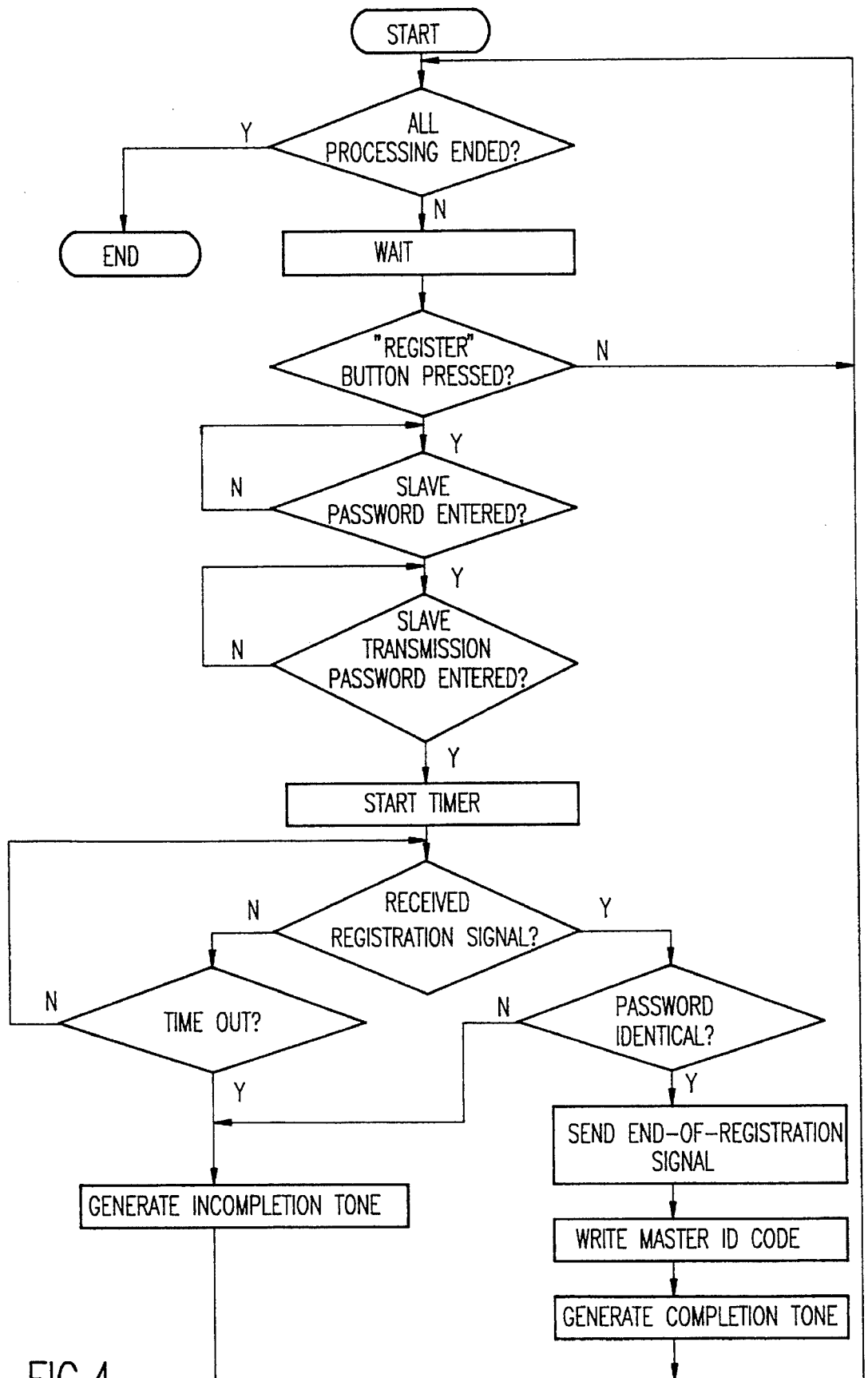
FIG. 4 is a flowchart representative of a specific operation of a controller included in a slave unit of a second embodiment of the present invention.

FIG. 4 is a flowchart showing a specific operation of a slave unit and representative of a second embodiment of the present invention. This embodiment differs from the first embodiment in that the user enters, on the slave unit, the password stored in the slave unit and slave unit transmission password, but not the ID code of the desired master unit, and in that the slave unit adds the master unit ID code, included in the registration signal from the master unit, to the end-of-registration signal to be sent to the master unit. This embodiment is also implemented by the arrangement shown in FIG. 1 and the procedure of FIG. 2 relating to the master unit.

Figure 5:
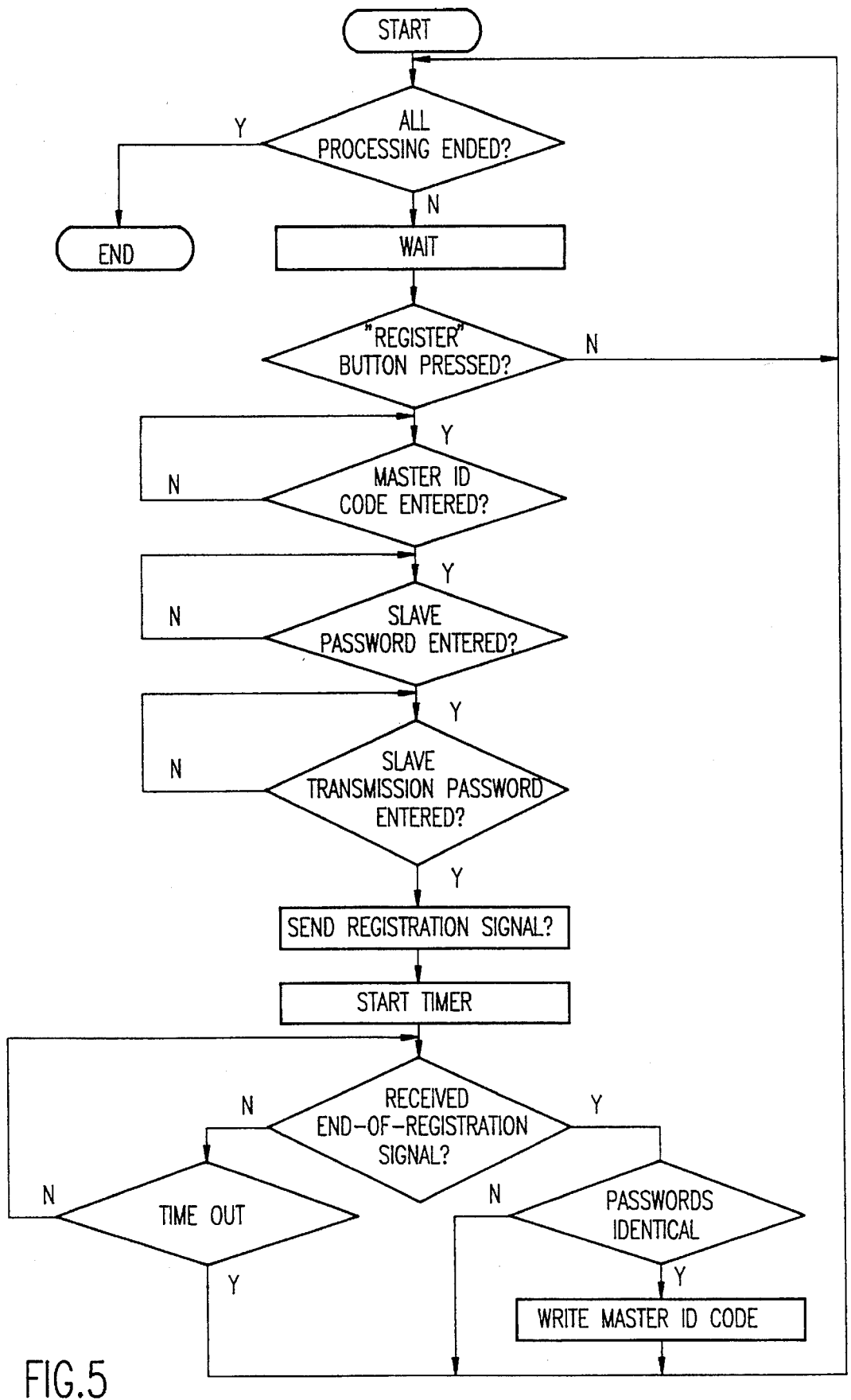
FIGS. 5 and 6 are flowcharts respectively showing specific operations of controllers included in a master unit and a slave unit of a third embodiment of the present invention.
Figure 6:
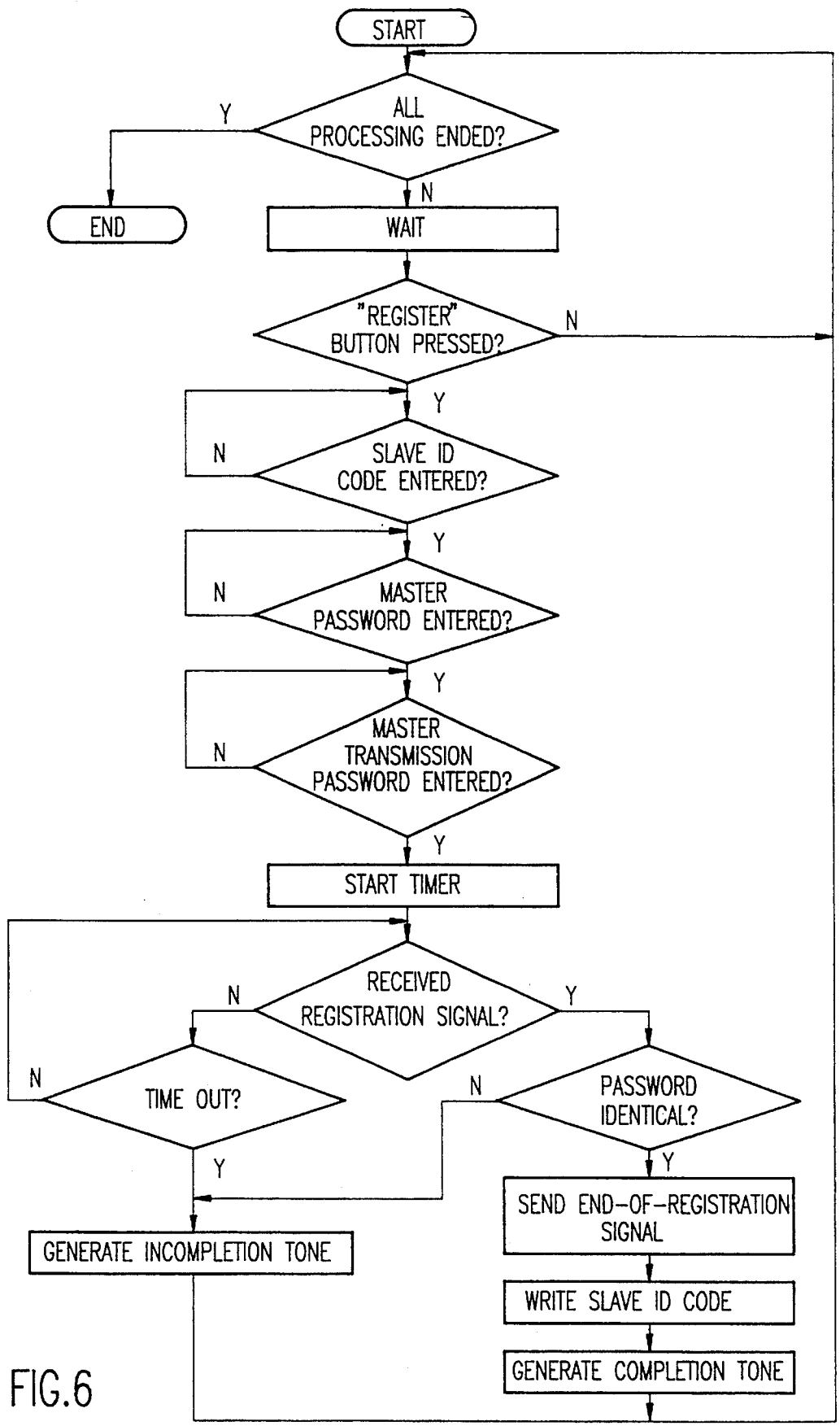

FIG. 5 is a flowchart showing a specific operation of a slave unit and representative of a third embodiment of the present invention. In this embodiment, a master unit is operated as shown in FIG. 6. This embodiment differs from the first embodiment in that the registration signal is sent from the slave unit to the master unit, while the end-of-registration signal is returned from the master unit to the slave unit. The illustrative embodiment is also implemented by the circuitry shown in FIG. 1.

Figure 7:
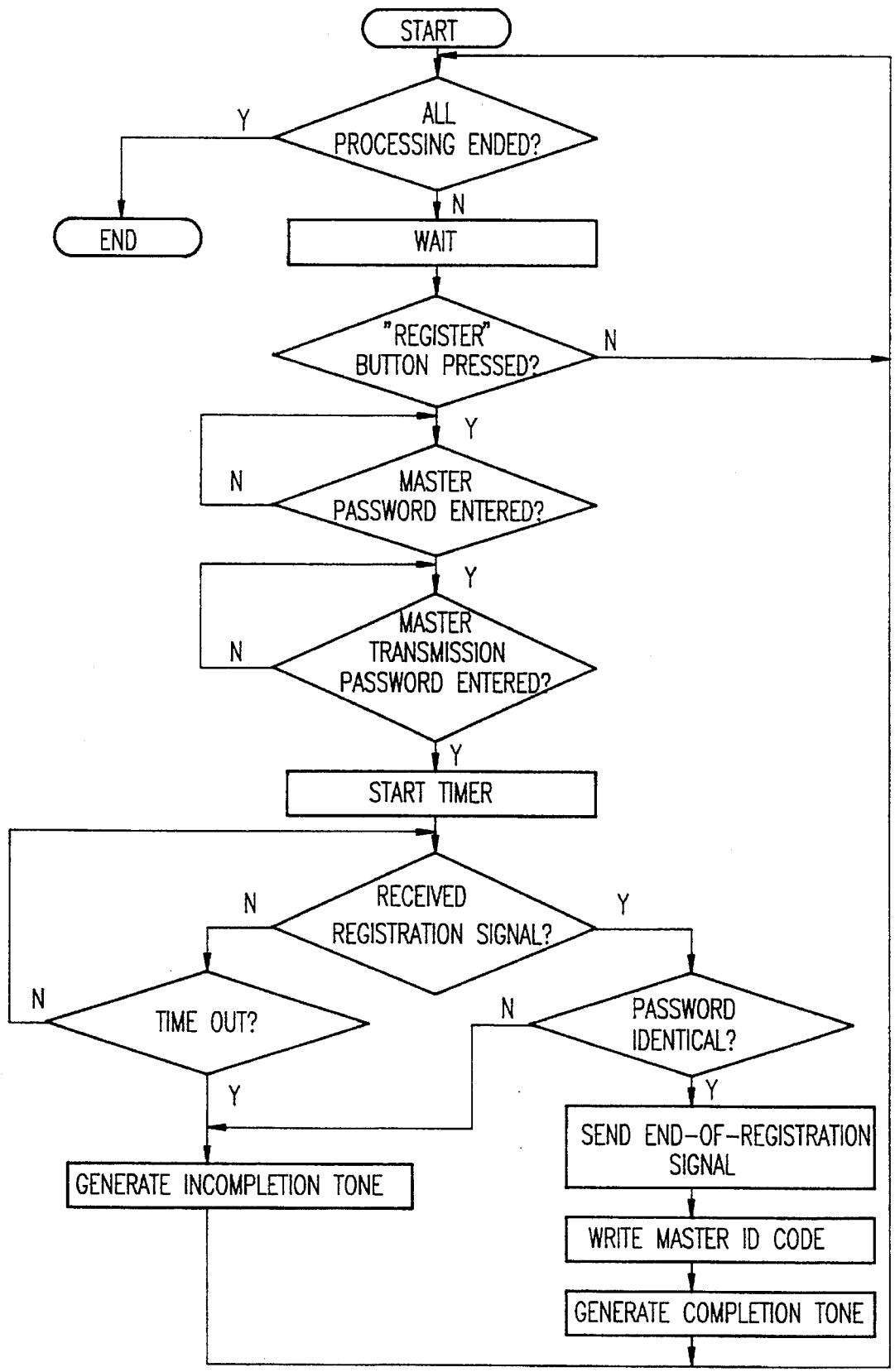
FIG. 7 is a flowchart demonstrating a specific operation of a controller included in a master unit of a fourth embodiment of the present invention.

FIG. 7 is a flowchart showing a specific operation of a master unit and representative of a fourth embodiment of the present invention. This embodiment is similar to the third embodiment except that the user enters the password stored in the master unit and master unit transmission password, but not the ID code of the slave unit, on the master unit, and that the slave unit ID code added to the registration signal is sent together with the end-of-registration signal. This embodiment is also implemented by the circuitry shown in FIG. 1. The master unit executes the procedure shown in FIG. 5.

Figure 8:
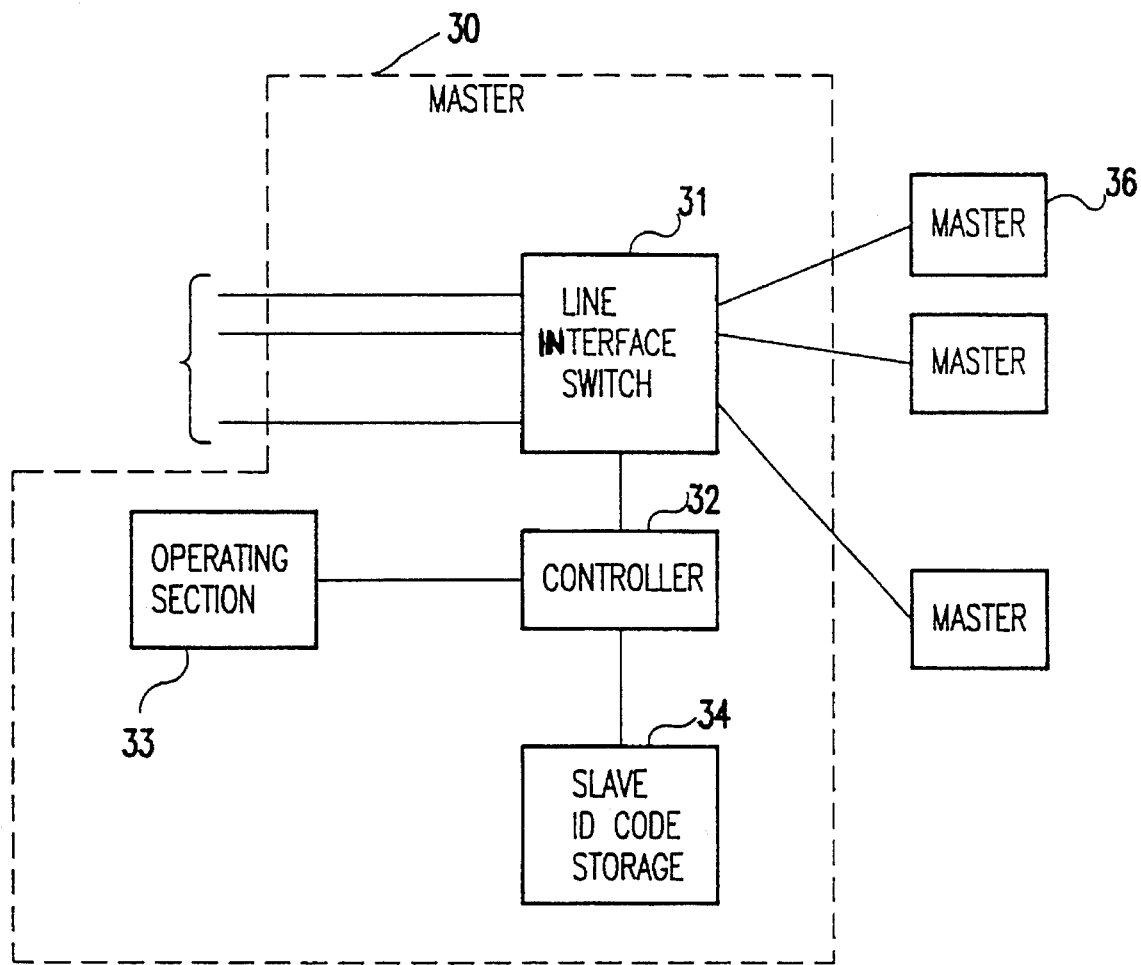
FIG. 8 is a block diagram schematically showing a main unit forming part of a fifth embodiment of the present invention.

FIG. 8 schematically shows a cordless telephone system representative of a fifth embodiment of the present invention. As shown, the system includes a main unit 30, a plurality of master units 36, and a plurality of slave units, not shown. The main unit 30 has a line interface switch 31, a controller 32, an operating section 33, and a slave unit ID code storage 34. This embodiment is similar to the first embodiment except that the main unit 30 is provided witch the slave unit ID code storage 34 and the operating section 33. The system of FIG. 8 is, in principle, operated in the same manner as the system of FIG. 1 except that the main unit 30 and master units 36 cooperate as if they were the master unit 10, FIG. 1.

In summary, it will be seen that the present invention provides a cordless telephone system which eliminates erroneous connection even when a plurality of pairs of master and slave units adjoining each other are operated for registration at the same time, thereby promoting sure registration. In addition, the system ensures safe registration even if the ID codes of the units are known to a third party.

Various modifications will become possible for those skilled in the art after receiving the teachings of the present disclosure without departing from the scope thereof. For example, in the first, second and fifth embodiments, the slave unit stores, on receiving a correct registration signal from the master unit (main unit), a master unit ID code without volatilizing it. Alternatively, in a surer and safer procedure, the master unit (main unit) may send, on receiving an end-of-registration signal from the slave unit, an acknowledge signal to the slave unit and store a slave unit ID signal in a nonvolatile manner, in which case the slave unit will store the master unit ID code in a nonvolatile manner in response to the acknowledge signal. In the third and fourth embodiments, the master unit stores, on receiving a correct registration signal from the slave unit, a slave unit ID code without volatilizing it. These embodiments may be modified, for a sureness and safety purpose, such that the slave unit sends, on receiving an end-of-registration signal from the master unit, an acknowledge signal to the master unit and stores a master unit ID signal in a nonvolatile fashion, while the master unit stores a slave unit ID code in response to the acknowledge signal.

The illustrative embodiments are arranged such that the slave unit ID code storage 16 of the master unit 10, or the storage 34 of the main unit 30, and the master unit ID code storage 25 of the slave unit 20 are each caused to write the ID code of the slave unit or that of the master unit in an idle address location thereof. If desired, the user may enter an address location number together with the other information in the event of registration. This makes it possible to replace an ID code registered at a certain address location of the storage 16 or 34 with an ID code assigned to a new unit or to cancel the registration in the storage 16 or 34. Furthermore, when a particular extension number is given to each slave unit, as in a PBX (Private Branch Exchange), the storages 16 and 34 may have the address locations thereof managed on an extension number basis; then the user will enter an address location number in the form of an extension number.

What is claimed is:

1. A cordless telephone system comprising:

a plurality of groups of master units and slave units for being connected to each other, and each including transmitting/receiving means for interchanging signals over a radio channel, said master units and said slave units each comprising storing means for storing a master unit ID code and a slave unit ID code which are different from each other, and control means for controlling said transmitting/receiving means, said master units each comprising master unit operating means accessible for entering the slave unit ID code and a slave unit password assigned to one of said slave units to be newly connected to the master unit, and a master unit password assigned to said master unit, said slave units each comprising slave unit operating means accessible for entering the master unit ID code and the master unit password assigned to said master unit to which said slave unit is to be newly connected, and the slave unit password assigned to said slave unit, said control means of said master units each comprising means for transmitting a registration signal to which are added the slave unit ID code and slave unit password having been entered, and the master unit ID code stored in said master unit;

said control means of said slave units each comprising means for storing, if the slave unit ID code and the slave unit password added to the registration signal are respectively identical with the slave unit ID code stored and the slave unit password entered, said slave unit ID code of said registration signal in said storing means, and sending an end-of-registration signal to which are added the master unit ID code added to said registration signal, the master unit entered, and said slave unit ID code stored, said control means of said master units each further comprising means for storing, if the master unit ID code and the master unit password added to the end-of-registration signal are respectively identical with the master unit ID code stored and the master unit password entered, the slave unit ID code having been added to said end-of-registration signal.

2. A system as claimed in claim 1, wherein said control means of said master unit and said slave unit, which are for being connected to each other, respectively further comprise means for adding the master unit ID code and the slave unit ID code stored to control signals to be interchanged, to thereby confirm a unit sent said control signals and a unit to receive said control signals, whereby erroneous connection is eliminated.

3. A cordless telephone system comprising:

a plurality of groups of master units and slave units for being connected to each other, and each including transmitting/receiving means for interchanging signals over a radio channel, said master units and said slave units each comprising storing means for storing a master unit ID code arid a slave unit ID code which are different from each other, and control means for controlling said transmitting/receiving means, said master units each comprising master unit operating means accessible for entering the slave unit ID code and a slave unit password assigned to one of said slave units to be newly connected to the master unit, and a master unit password assigned to said master unit, said slave units each comprising slave unit operating means accessible for entering a master unit password assigned to the master unit to which the slave unit is to be newly connected, and the slave unit password assigned to said slave unit, said control means of said master units each comprising means for transmitting a registration signal to which are added the slave unit ID code and the slave unit password entered, and the master unit ID code stored, said control means of said slave units each comprising means for storing, if the slave unit ID code and the slave unit password added to the registration signal are respectively identical with the slave unit ID code stored and the slave unit password entered, said slave unit ID code of said registration signal in said storing means, and sending an end-of-registration signal to which are added the master unit ID code added to said registration signal, the master unit password entered, and said slave unit ID code stored, said control means of said master units each further comprising means for storing, if the master unit ID code and the master unit password added to the end-of-registration signal are respectively identical with the master unit ID code stored and the master unit password entered, the slave unit ID code having been added to said end-of-registration signal.

4. A cordless telephone system comprising:

a plurality of groups of master units and slave units for being connected to each other, and each including transmitting/receiving means for interchanging signals over a radio channel, said master units and said slave units each comprising storing means for storing a master unit ID code and a slave unit ID code which are different from each other, and control means for controlling said transmitting/receiving means, said slave units each comprising slave unit operating means accessible for entering the master unit ID code and a master unit password assigned to said master unit to which the slave unit is to be newly connected, and said slave unit password assigned to said slave unit, said master units each comprising master unit operating means accessible for entering the slave unit ID code and a slave unit password assigned to one of said slave units to be newly connected to the master unit, and a master unit password assigned to said master unit, said control means of said slave units each comprising means for transmitting a registration signal to which are added the master unit ID code and the slave unit password entered, and the slave unit ID code assigned to the slave unit, said control means of said master units each comprising means for storing, if the master unit ID code and the master unit password added to the registration signal are respectively identical with the master unit ID code stored and the master unit password entered, the slave unit ID code of said registration signal in said storing means, and sending an end-of-registration signal to which are added said slave unit ID code and the slave unit password entered, and said master unit ID code stored, said control means of said slave units each further comprising means for storing, if the slave unit ID code and the slave unit password added to the end-of-registration signal are respectively identical with the slave unit ID code stored and the slave unit password entered, the master unit ID code having been added to said end-of-registration signal.

5. A cordless telephone system comprising:

a plurality of master units and a plurality of slave units for being connected to each other, and each including transmitting/receiving means for interchanging signals over a radio channel, said master units and said slave units each comprising storing means for storing a master unit ID code and a slave unit ID code which are different from each other, and control means for controlling said transmitting/receiving means, said slave units each comprising slave unit operating means accessible for entering the master unit ID code and a master unit password assigned to the master unit to which the slave unit is to be newly connected, and a slave unit password assigned to said slave unit, said master units each comprising master unit operating means accessible for entering the slave unit ID code assigned to the slave unit which is to be newly connected to the master unit, and a master unit password assigned to said master unit, said control means of said slave units each comprising means for transmitting a registration signal to which are added the master unit ID code entered and the master unit password entered, and the slave unit ID code stored, said control means of said master units each comprising means for storing, if the master unit ID code and the master unit password added to the registration signal are respectively identical with the master unit ID code stored and the master unit password entered, the slave unit ID code of said registration signal in said storing means, and sending an end-of-registration signal to which are added the slave unit ID code added to said registration signal, the slave unit password entered, and said master unit ID code stored, said control means of said slave units each further comprising means for storing, if the slave unit ID code and the slave unit password added to the end-of-registration signal are respectively identical with the slave unit ID code stored and the slave unit password entered, the master unit ID code having been added to said end-of-registration signal.

6. A cordless telephone system comprising:

a plurality of groups of master units and slave units for being connected to each other and each including transmitting/receiving means for interchanging signals over a radio channel and transmission/reception control means for controlling said transmitting/receiving means, and a main unit including a line interface switch connected to said master units by respective wired channels and switch control means for controlling said line interface switch, said slave units each comprising slave unit storing means for storing a master unit ID code assigned to the master unit, to which the slave unit is connectable, and a slave unit ID code of said slave unit which is different from said master unit ID code, said main unit comprising main unit storing means for storing the slave unit ID code of the slave unit connectable to the master unit, said master units each comprising master unit storing means for storing the master unit ID code assigned thereto, said main unit comprising main unit operating means accessible for entering the slave unit ID code and a slave unit password assigned to one of said slave units to be newly connected, and a main unit password, said switch control means comprising means for outputting a registration signal to which are added the slave unit ID code and the slave unit password entered, said transmission/reception control means of said master units each comprising means for transmitting the registration signal by adding the master unit ID code stored, said slave units each comprising slave unit operating means accessible for entering the master unit ID code assigned to the master unit to which the slave unit is to be newly connected, a main unit password, and the slave unit password assigned to said slave unit, said transmission/reception control means of said slave units each comprising means for storing, if the slave unit ID code and the slave unit password added to the registration signal are respectively identical with the slave unit ID code stored and the slave unit password entered, the master unit ID code of said registration signal in said storing means, and means for sending an end-of-registration signal to which are added said master unit ID code and the main unit password entered, and the slave unit ID code stored, said transmission/reception control means of said master units each further comprising means for receiving the end-of-registration signal including the master unit ID code stored, said switch control means further comprising means for storing, if the main unit password added to the end-of-registration signal received is identical with the main unit password entered, the slave unit ID code having been added to said end-of-registration signal.

7. A system as claimed in claim 6, wherein said switch control means, said transmission/reception control means of said master units, and said transmission/reception control means of said slave units further comprise means for adding the master unit ID code and the slave unit ID code stored to control signals to be interchanged, to thereby confirm a unit sent said control signals and a unit to receive said control signals, whereby erroneous connection is eliminated.

* * * * *